United States Patent Office.

WILLIAM G. DEAN, OF BROOKLYN, NEW YORK.

Letters Patent No. 113,859, dated April 18, 1871.

IMPROVEMENT IN PREPARING FLOUR FOR USE IN CONFECTIONERY, &c.

The Schedule referred to in these Letters Patent and making part of the same.

To all whom it may concern:

Be it known that I, WILLIAM G. DEAN, of Brooklyn, in the county of Kings and State of New York, have invented and made a new and useful Improvement in Preparing Flour, and the following is declared to be a correct description thereof.

Wheat and other kinds of flour have been used in the arts and manufactures for the purpose of giving color to different substances, such as confectionery and mustard, in the latter instance imparting to the brownish mustard the brilliant yellow generally preferred.

Flour for such purposes has been colored by turmeric, and the method pursued has been to mix ground turmeric with flour, then to regrind the mass, to produce an intimate union, and then the mass is exposed to the atmosphere, which frequently requires several days for the color to be developed, and afterward the color changes from a light yellow to a darker yellow.

In this manner much more turmeric is required than in my process, and the color is not permanent, but grows darker.

I have discovered that the action of heat causes the turmeric to impart color rapidly to flour, and enables me to use a very small proportion of turmeric and obtain a permanent color.

I mix about three pounds of ground turmeric with about one hundred pounds of flour, or in about that proportion, and place them in a suitable vessel where the mass can be stirred or agitated thoroughly, and at the same time submitted to a temperature of 200° or more of heat, care being taken to prevent scorching the flour.

The heat develops the color of the turmeric and imparts said color to the flour, giving to the same a bright yellow appearance, and at the same time drying the flour so that it may be preserved.

If the proportion of turmeric is increased the color will be darker.

I claim as my invention—

The process herein specified of coloring flour.

Signed by me this 19th day of January, 1871.

WM. G. DEAN.

Witnesses:
CHAS. H. SMITH,
GEO. T. PINCKNEY.